(12) United States Patent
Keitel et al.

(10) Patent No.: US 8,373,083 B2
(45) Date of Patent: Feb. 12, 2013

(54) METHOD FOR CONNECTING THICK-WALLED METAL WORKPIECES BY WELDING

(75) Inventors: Steffen Keitel, Halle (DE); Jan Neubert, Halle (DE); Wolfgang Scheller, Tonisvorst (DE); Markus Liedtke, Waltrop (DE); Christian Caesar, Bottrop (DE)

(73) Assignee: V & M Deutschland GmbH, Düsseldorf (DE)

( * ) Notice: Subject to any disclaimer, the term of this patent is extended or adjusted under 35 U.S.C. 154(b) by 385 days.

(21) Appl. No.: 12/666,424

(22) PCT Filed: Jun. 26, 2008

(86) PCT No.: PCT/DE2008/001063
§ 371 (c)(1),
(2), (4) Date: May 4, 2010

(87) PCT Pub. No.: WO2009/000259
PCT Pub. Date: Dec. 31, 2008

(65) Prior Publication Data
US 2010/0206850 A1    Aug. 19, 2010

(30) Foreign Application Priority Data

Jun. 26, 2007 (DE) .......................... 10 2007 030 050
Jun. 24, 2008 (DE) .......................... 10 2008 029 724

(51) Int. Cl.
*B23K 31/02* (2006.01)
(52) U.S. Cl. ..................................... 219/61; 219/137 R
(58) Field of Classification Search ............... 219/61, 219/75, 121.64, 137 R
See application file for complete search history.

(56) References Cited

U.S. PATENT DOCUMENTS

| 4,142,085 A * | 2/1979 | Knipstrom et al. ............. 219/61 |
| 4,255,641 A * | 3/1981 | Connell et al. ................... 219/61 |
| 4,686,350 A * | 8/1987 | Bodewig .................. 219/130.51 |
| 5,030,812 A * | 7/1991 | Sugitani et al. ........... 219/124.34 |
| 6,683,268 B2 * | 1/2004 | Briand et al. .................... 219/61 |
| 2007/0119829 A1 * | 5/2007 | Vietz et al. ............... 219/121.63 |

FOREIGN PATENT DOCUMENTS

| DE | 199 50 437 C2 | 6/2001 |
| EP | 1 160 046 A | 12/2001 |
| EP | 1 900 472 A | 3/2008 |
| FR | 2 634 577 A | 1/1990 |
| WO | WO 2005/056230 A | 6/2005 |

* cited by examiner

*Primary Examiner* — Kimberly Rizkallah
*Assistant Examiner* — Duy T Nguyen
(74) *Attorney, Agent, or Firm* — Henry M. Feiereisen LLC

(57) ABSTRACT

The invention relates to a method for connecting thick-walled metal workpieces by welding. In order to create the weld joint, the cross-sections are provided with a maximum of three weld regions according to wall thickness, the welding being carried out by a combined use of welding methods: the first weld region (root) is welded by means of laser beam welding or hybrid laser-arc welding, the second weld region is welded by means of hybrid laser-arc welding, and the third weld region required occasionally depending on the thickness of the sheet metal is welded by means of hybrid laser-arc welding or simply arc welding. The invention also relates to a seam preparation corresponding to the respective welding method used.

20 Claims, 3 Drawing Sheets

METHOD FOR CONNECTING THICK-WALLED METAL WORKPIECES BY WELDING

CROSS-REFERENCES TO RELATED APPLICATIONS

This application is the U.S. National Stage of International Application No. PCT/DE2008/001063, filed Jun. 26, 2008, which designated the United States and has been published as International Publication No. WO 2009/000259 and which claims the priorities of German Patent Applications, Serial No. 10 2007 030 050.8, filed Jun. 26, 2007, and Serial No. 10 2008 029 724.0, filed Jun. 24, 2008, pursuant to 35 U.S.C. 119(a)-(d).

The invention relates to a method for connecting thick-walled metal workpieces by welding, in particular of pipes of steel, as well as to a device for carrying out the method.

In addition to the connection of pipes, the welding method according to the invention is equally applicable for example for connecting thick-walled metal sheets or hollow sections of varying thicknesses and cross sections or for connecting penetrations of pipes of hollow sections.

In particular, the invention relates to pipes with wall thicknesses of more than 8 mm or 15 mm, which are connected to one another by different welding methods, such as, for example, laser beam welding and arc welding, to form e.g. pipelines.

Laser beam welding of pipes is generally known and efforts are continuously spent to significantly reduce the seam cross section in comparison to conventional welding methods, such as manual arc welding or metal inert gas welding (MIG), and the welding times through application of higher welding rates to thereby improve economic efficiency.

There was, however, a drawback that the seam preparations and tolerances, required for laser beam welding, could not be reconciled with the constraints during implementation of pipe strings for laying pipelines.

It is also known that laser beam welding can be used to realize good welding results in varying positions without the need for complex parameter adjustments because the welded seams are characterized in this welding method by a large ratio of depth to width of the seam. This could not be exploited heretofore, however, as a result of the tolerance requirements during production of pipelines.

A laser beam welding method for making connections of thick-walled pipes is known, e.g., from DE 199 50 437 C2 which describes a method in which the pipe ends to be joined are provided with two weld regions. In the first weld region, the ends are butt-joined, the second weld region which follows is configured in the shape of a V. The butting ends are joined to one another by laser beam welding, while at least one auxiliary workpiece is inserted in the second V-shaped zone and connected to the opposing sides of the butted workpiece ends by respective welding seams. The partially butting regions of the workpiece ends are joined with a further welding seam.

A drawback of this method is the need for an additional workpiece which has to be conformed to the respective notch configuration. As a result, manufacturing time is increased and thus the production costs of the pipe connection.

Furthermore, it is known from WO 2005/056230 A1 to employ orbital welding of pipes to form pipelines, involving a selective combination of laser beam welding with a metal inert gas (MIG) welding process to provide a hybrid laser MIG welding process. In such a hybrid welding process, the laser beam and the arc of the MIG welding process act upon the welding spot at the same time.

The manner as to how these welding methods are used with respect to the high demands on quality and efficiency of the welded connections of pipe strings for laying pipes and which seam preparations are hereby necessary is not described.

It is generally known to use one or more welding heads simultaneously or offset in time, when welding thick-walled workpieces. In order to fill the entire seam cross section, several layers are welded. Moreover, it is necessary to match during welding in some cases the welding parameters to the respective welding position.

In view of the size of melt baths during MIG welding, the welding parameters must be adjusted in dependence on the welding positions. In some cases, the welding torch has to undergo oscillating movements. As the seam root and the first weld layer must meet especially high quality demands, these seam regions are frequently realized by means of manual arc welding or tungsten inert gas welding (TIG). These welding methods are disadvantageous because of the very small welding rate.

In view of the described tolerance demands of a connection of thick-walled pipes by laser welding and as a consequence of the still unresolved problem to realize with technically viable and efficient laser power a qualitatively reliable and efficient weld joint with a minimal number of welded regions and weld layers, the welding of thick-walled workpieces, like e.g. of pipes, by laser or hybrid laser methods has not gained any relevance to date.

The application of laser beam welding has been further shown to be economically disadvantageous because about 15-20% of the introduced laser power can no longer be made available for the actual welding process as a result of the transmission of laser beams through the joined gap.

A further important factor for establishment of innovative processes, such as laser beam welding in the area of the pipe installation is the quality and stability of the root formation of the welded seam. As of yet, the known laser welding processes could not meet these demands.

The formation of the root significantly impacts the mechanical and technological properties, in particular the fatigue and vibration strengths of the weld joint. The objective is hereby the realization of a root which is as notch-free as possible and has slight seam elevation and even configuration.

SUMMARY OF THE INVENTION

It is an object of the invention to improve the laser or hybrid laser arc welding methods for connecting thick-walled workpieces, in particular of pipes with wall thickness of >8 mm, in particular >15 mm in such a way as to attain high efficiency of the welding process with a minimal number of welded zones and weld layers while yet satisfying the qualitative demands on the weld joint.

This object is solved by a method for connecting thick-walled metal workpieces by welding, in particular pipes of steel with wall thickness >8 mm, in particular >15 mm, which are connected with at least two weld joints by means of laser beam welding and/or arc welding, with the cross sections to be welded being provided prior to welding in at least two weld regions with a seam preparation for joining across an entire surface, wherein the weld joint is made by providing the cross sections in dependence on the wall thickness with a maximum of three weld regions and the welding involves a combined application of the welding methods, wherein in order for the weld joint to meet the high qualitative demands and to attain a high welding power, the first weld region (root) is realized by means of laser beam welding or hybrid laser arc welding, the second weld region is realized by means of hybrid laser arc welding, and the third weld region optionally required depending on the thickness of the metal sheet is realized by means of hybrid laser arc welding or solely by arc welding, wherein in the presence of three weld regions the second weld region is welded as an alternative also solely by arc welding, and each of the weld regions is provided with one weld layer or several weld layers in single or multi-head technique, wherein the seam preparation suited to the respectively applied welding method is executed in such a way that there is provided an I joint with a maximum gap of 3 mm for the first weld region, a V or tulip-shaped seam preparation for the second weld region, and for the third weld region a V or tulip-shaped seam preparation at a reduced angle compared to the V-shaped seam preparation of the second weld region when a V-shaped seam preparation is involved, wherein the proportion of the laser is at least 10% of the momentary welding performance, when hybrid laser arc welding is employed. Advantageous refinements are the subject matter of subclaims.

According to the teaching of the invention, the weld joint is produced by a combination of two or more different welding methods which are realized with a maximum of three weld region in dependence on the wall thickness, wherein in order for the weld joint to meet the high qualitative demands and to attain a high welding power, the first weld region (root) is realized by means of laser beam welding or hybrid laser arc welding, the second weld region is realized by means of hybrid laser arc welding, and the third weld region optionally required depending on the thickness of the metal sheet is realized by means of hybrid laser arc welding or solely by arc welding, wherein in the presence of three weld regions the second weld region is welded as an alternative also solely by arc welding. The weld regions are hereby filled with one weld layer or several weld layers, wherein single-head or multi-head technique is applied. When employing the multi-head technique, the welding heads may be used simultaneously or offset in time.

The seam preparation suited to the respectively applied welding method is executed in such a way that there is provided an I joint with a maximum gap of 3 mm for the first weld region, a V or tulip-shaped seam preparation for the second weld region, and for the third weld region a V or tulip-shaped seam preparation at a reduced angle compared to the V-shaped seam preparation of the second weld region when a V-shaped seam preparation is involved. When hybrid laser arc welding is employed, the proportion of the laser is at least 10% of the momentary welding power.

After extensive testing, the method according to the invention enables for the first time to exploit the benefits of laser beam welding for the implementation of pipe connection and to realize a reliable pipe connection with a minimal number of weld regions and weld layers and with technically viable and efficient laser power.

The seam preparation is optimized with respect to the demands of the laser welding or hybrid laser arc welding in such a way that the economic advantages of these methods are exploited for attaining optimal welding results.

As an important step for establishing innovative welding processes, like laser beam welding or hybrid laser arc welding, for example in the field of pipe installation, it has also been attained through optimization of the welding gap geometry with respect to the demands of laser beam welding or hybrid laser arc welding that the quality and stability of the root formation is so optimized that highest demands are met while utilizing at the same time the high power potential of the laser welding process.

Optionally, it may be advantageous to move the laser beam in an oscillating manner during welding in order to assist the even formation of the root.

It is also possible to attain an optimized welding process that meets the demands by varying the laser power during the welding process. Furthermore, the method according to the invention affords the advantageous option for process optimization by varying the focus of the laser beam and the position of the laser beam in relation to the butt surfaces to be welded in the weld regions.

The seam preparation variants are hereby characterized by properties which take into account the typical properties of pure laser beam welding as well as the linkage between laser beam and arc in the further layer buildup.

As a result, the need for producing regions of required mechanical and thermal characteristics is minimized and the complexity of this processing step is correspondingly reduced. The resultant welding gap geometry can be designated as tight gap that best conforms to a laser beam.

The welding gap geometry of the method according to the invention is especially characterized by enabling a connection of a significant region of the welding seam cross section solely through the direct action of the laser beam in the welding process zone, when connecting thick-walled workpieces.

As a result, the specific benefits of the laser welding process, like high welding rate, deep welding effect, and slight heat impact, can be exploited in an optimum manner. For example, welding rates of above 0.5 m/min can be attained in dependence on the thickness of the metal sheet.

These advantages are realized in accordance with the invention by the combination of various welding methods with a seam preparation which is suited to the respectively applied welding method and meets quality requirements.

Used for the first weld region of the root position in a gap-dependent manner is initially laser beam welding or hybrid laser arc welding, with the hybrid laser arc welding involving preferably the metal inert gas welding (MIG) in addition to laser welding. A butt joint with a maximum of gaps of 3 mm, advantageously <1.5 mm, has been shown as beneficial for the seam preparation.

A metallurgically beneficial effect of the weld joint that meets mechanical demands is realized when the welding rate of the weld layer(s) following the root position is so adjusted that a tempering effect of the preceding weld layer(s) is realized.

The weld joint is produced with only two weld regions and with one weld layer, respectively, when the wall thicknesses range between 8 and 15 mm. In order to establish a complete connection of the cross section with high welding rate, the seam preparation for the second weld region is V-shaped with an opening angle of maximal 70°, or tulip-shaped, with the welding executed advantageously as hybrid laser MIG welding. Optionally, it may be advantageous to use as an alternative TIG or plasma welding instead of the partial MIG welding process.

The weld joint is advantageously made with three weld regions, when the wall thicknesses are above 15 mm, with the seam preparation being the same for the first and second weld regions as in the case of smaller wall thicknesses, and hybrid laser MIG welding is also utilized.

The third weld region has also a tulip-shaped or V-shaped seam preparation. The opening angle of the V seam is smaller for this weld region than the opening angle of the V seam of the second weld region. The opening angle is hereby advantageously maximal 60° or maximal 30° (flank angle) at each seam flank. It is, however, also feasible to provide the seam flanks with different flank angles so as to establish an asymmetric opening of the V seam.

This weld region is welded advantageously by means of hybrid laser MIG welding or MIG welding alone with one weld layer or several weld layers. It may further be of advantage to oscillate the welding head or the welding heads during welding in order to ensure a reliable and flawless seam flank penetration.

It has been shown as especially beneficial for process configuration, like e.g. the beam guidance, when using fiber-guided laser irradiation.

Suiting the laser power has been proven especially advantageous, when welding the filling and final layers.

A known effect in particular when hybrid laser MIG welding is involved resides in the stabilizing effect which the laser beam is able to exert upon the arc. As a consequence of the combination of the laser beam with the arc process, various parameter combinations can be applied with which no stable process can be attained when using a conventional MIF welding alone. This effect can be utilized for all weld regions with a parameter optimization that results in efficiency and weld seam quality.

The filling and final layers can thus be carried out by means of hybrid laser MIG welding, with a laser power of at least 10% of the total process power being used for stabilization of the arc.

A further positive effect with respect to the prevention of flaws in the weld seam can be realized by manipulating the laser beam.

An essential advantage of the laser beam in combination with a MIG arc resides in the laser beam energy supplied in a targeted manner to the melt bath or welding process.

As a consequence, there is the possibility to avoid weld seam flaws, e.g. lack of fusion, as a result of poor temperature distribution. This may be of relevance in particular when filling layers are realized in connection with respectively unfavorable seam flank angles.

As a result of the variation in time and location of the laser power within the hybrid laser MIG welding processes, the process reliability and productivity can thus be enhanced.

In particular when filling layers are produced, the manipulation of the laser beam may realize a spatial and chronological variation of the laser beam power supplied to the process so that the presence of weld seam flaws, e.g. of lack of fusion in the seam flank region, can be reduced.

A further positive effect in connection with hybrid laser arc welding relates to minimization of flaws and is realized when the proportion of the laser power introduced into the weld joint in relation to the introduced total power is greater in the first weld region than in the second and/or third weld region.

Prior to welding, the pipes are normally positioned and clamped with a self-centering device to establish a defined welding position and thus a reproducible qualitatively reliable weld joint.

When the conventional root-side securement of the weld bath with a bath support device in the form of a copper shoe, as used for example in known MIG welding, is utilized, the root is formed via a recess in the shoe by direct contact with the melt bath.

The copper shoe is, however, unsuitable for formation of the root formed by laser welding because as a result of a transmission of the laser irradiation of about 15-20% of the introduced laser power through the joint gap, copper would melt on, as the root contacts the copper shoe, which is metallurgically unfavorable.

In accordance with the invention, the copper shoe is therefore modified in such a way that the formation of the root is established without contact so that no copper is received in the melt. The recess of the copper shoe is hereby configured in such a way as to reflect the transmitted laser irradiation from the recess back to the root to be formed and thereby melt the root and the adjacent workpiece regions so as to realize an even notch-free root contour.

It may also be of advantage to use process gas for flushing the recess of the copper shoe during welding. Process gases may have inert, active and/or reducing properties so that the heat transfer can be positively affected and thereby assist in the even formation of the root. The copper shoe may hereby be equipped without active cooling or with cooling, preferably with water.

The laser irradiation reflected by the copper shoe thus leads to an increase in performance of the welding process in addition to a qualitative improvement of the seam root.

Providing the recess with a surface to highly reflect the laser irradiation, e.g. through polishing the surface or respective coating application, has proven to be especially beneficial.

BRIEF DESCRIPTION OF THE DRAWING

Further features, advantages, and details of the invention are described in the following description of the illustrated figures.

It is shown in.

DETAILED DESCRIPTION OF PREFERRED EMBODIMENTS

Figure 1:
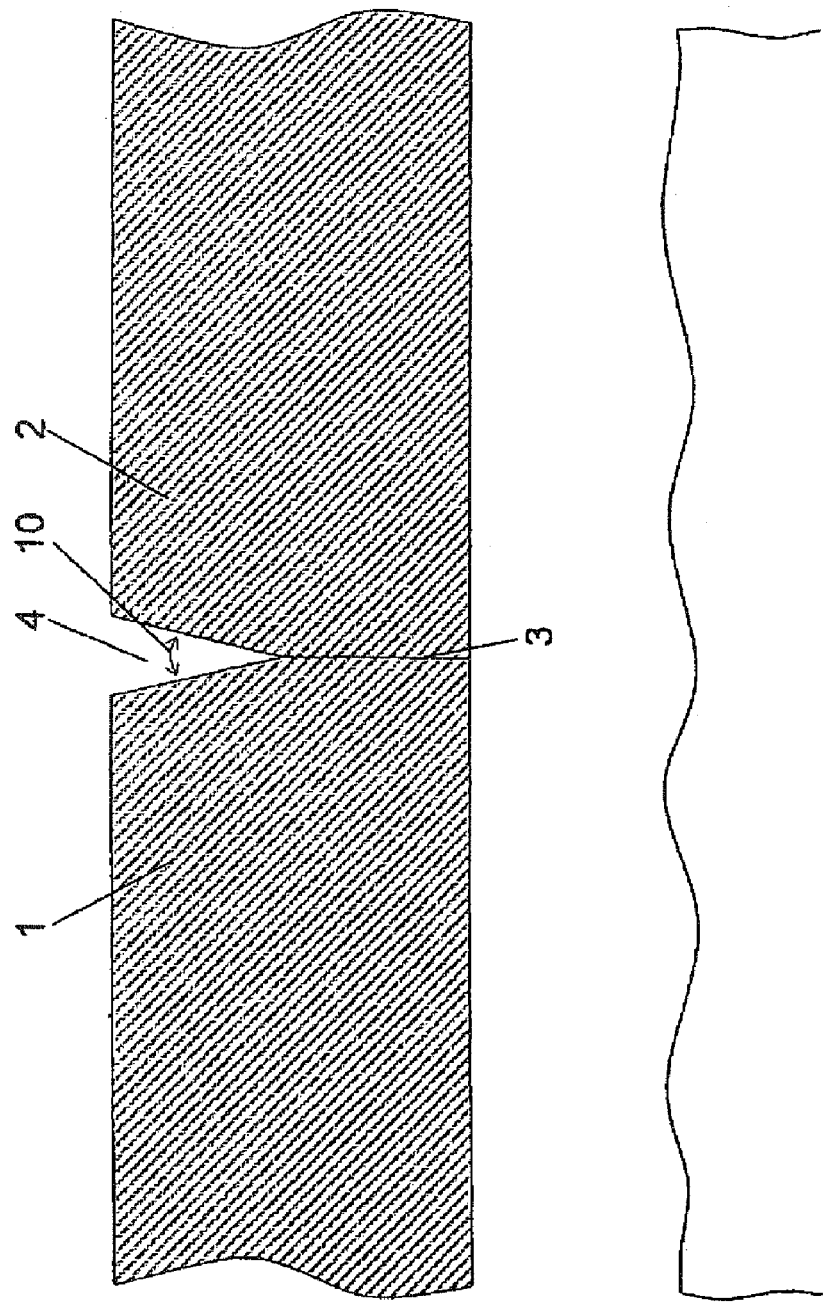
FIG. 1 a basic configuration of the weld regions for pipes with wall thicknesses of 8 to 15 mm, FIG. 2 like FIG. 1, however for wall thicknesses above 15 mm, FIG. 3 a bath support device in the form of a copper shoe in accordance with the invention.

FIG. 1 shows the basic configuration of the weld regions and the seam preparation as Y-seam for the method according to the invention for welding thick-walled pipes in the wall thickness range of 8 to 15 mm with two weld regions.

Depicted are portions of pipes 1, 2 which are provided in the first weld region (root position) with an I joint as seam preparation 3, with the gap being close to zero in this case.

At first laser beam welding or hybrid laser arc welding is used for the root position in gap-dependent manner, with the hybrid laser arc welding involving preferably MIG welding as part of the process in addition to laser welding.

When wall thicknesses between 8 and 15 mm are involved, the weld joint is realized preferably with only two weld regions, each with a weld layer, with the second layer serving as filling layer. In order to attain a fill connection of the pipe cross section at high weld rate, the seam preparation 4 for the second weld region is provided with a V seam with an opening angle 10 in this case of about 30°, wherein welding is executed advantageously by hybrid laser MIG welding.

Figure 2:
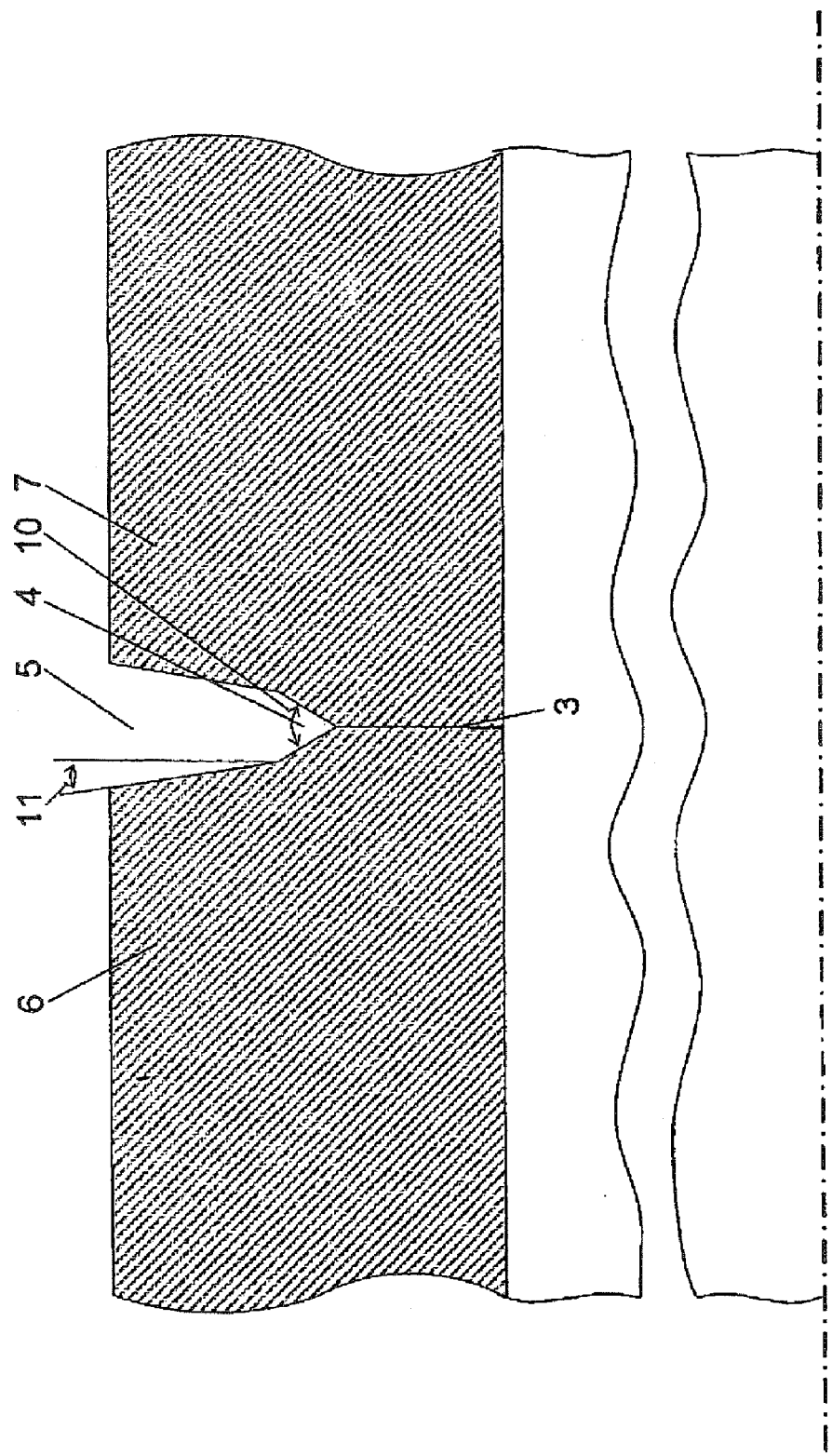

When wall thicknesses of above 15 mm are involved, the weld joint of the pipes 6, 7 is advantageously made with three weld regions (FIG. 2). The seam preparation 3 for the first weld region is also configured as I joint with a gap of almost zero. The seam preparation 4 for the second weld region is a V seam with an opening angle of about 45°, with the welding method involved being also advantageously hybrid laser MIG welding or solely arc welding.

The seam preparation 5 for the third weld region is also configured in the form of a V with a flank angle 11 of maximal 20°. Welding is implemented advantageously also by means of hybrid laser MIG welding or MIG alone in one weld layer or several weld layers.

Although V-shaped seam preparations 4, 5 are provided in FIGS. 1 and 2 for the second and third weld regions, respectively, the use of a tulip-shaped seam preparation or a combination of V-shaped and tulip-shaped seam preparation may also be possible as an alternative.

Figure 3:
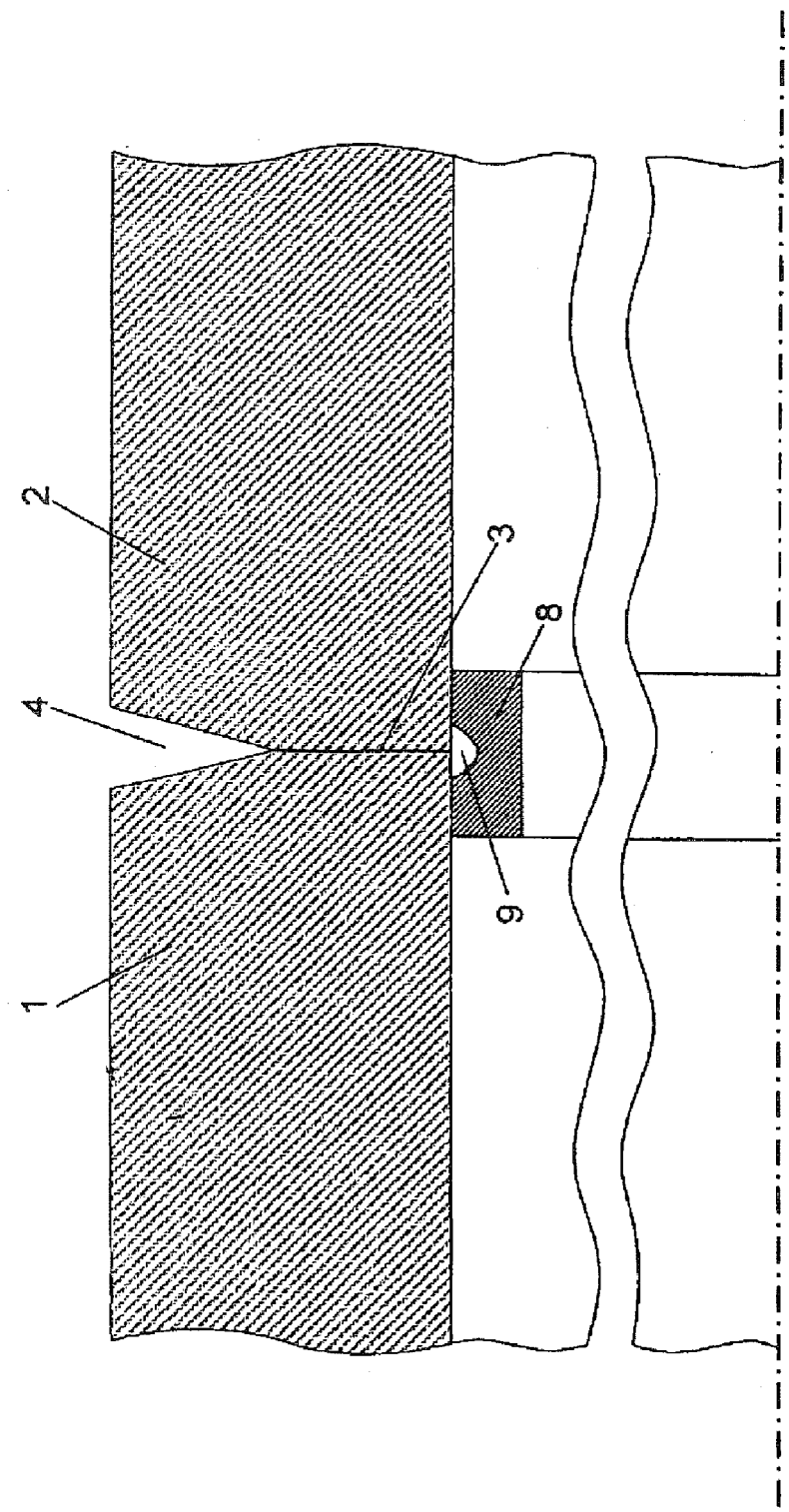

The bath support device according to the invention is illustrated in FIG. 3. Same reference symbols are used for same parts.

The seam preparation and the welding of the pipes 1, 2 is carried out in a same way as described in FIG. 1 so that further discussion is superfluous.

To support and form the melt bath, not shown here, during root welding, a bath support device 8 is provided in the area of the weld joint on the inside of the pipes 1, 2 and includes a recess 9 for contactless reception of the weld seam root which projects into the pipe interior.

The recess 9 is configured to reflect the laser irradiation transmitted through the root during laser beam welding from the recess 9 in direction of the forming seam root and thus directly impacts the outer shape and metallurgical configuration of the root.

What is claimed is:

1. A method for connecting thick-walled metal workpieces of a wall thickness of >8 mm, comprising the steps of:
    providing a weld joint in an area of confronting cross sections of workpieces to be joined, wherein the weld joint has a maximum of three weld regions;
    preparing a first one of the weld regions, representing a root of the weld joint, in the area of the confronting cross sections with a seam in the form of an I joint with a maximum gap of 3 mm;
    preparing a second one of the weld regions in the area of the confronting cross sections with a seam in the form of V or tulip-shaped configuration;
    welding the first one of the weld regions by laser beam welding or hybrid laser arc welding;
    welding the second one of the weld regions of the weld joint by arc welding only; and
    welding a third one of the weld regions by hybrid laser arc welding,
    wherein the third weld region has a V shaped configuration and is defined by an angle which is smaller than an angle of the V shaped seam of the second weld region, and wherein application of the hybrid laser arc welding involves a power proportion of the laser of at least 10% of a momentary welding power.

2. The method of claim 1, wherein each of the weld regions is provided with one weld layer or several weld layers in single or multi-head technique.

3. The method of claim 1, wherein the workpieces are pipes of steel.

4. The method of claim 1, wherein the workpieces have a wall thickness of >15 mm.

5. The method of claim 1, wherein the hybrid laser arc welding is a combination of laser beam welding and arc welding, wherein the arc welding is a metal inert gas (MIG) welding process.

6. The method of claim 5, wherein the MIG welding process is executed by pulsed arc welding.

7. The method of claim 1, wherein the hybrid laser arc welding is a combination of laser beam welding and arc welding, wherein the arc welding is a tungsten inert gas welding (TIG) process.

8. The method of claim 1, wherein the hybrid laser arc welding is a combination of laser beam welding and arc welding, wherein the arc welding is a plasma welding process.

9. The method of claim 1, wherein the one of the first and second weld regions which is welded last is realized by MIG welding.

10. The method of claim 1, wherein the second weld region is welded with one or more weld layers at a welding rate to effect a tempering of at least a preceding weld layer.

11. The method of claim 1, wherein a maximum value of 1.5 mm is maintained for the gap in the region of the I joint.

12. The method of claim 1, wherein a solid body laser or fiber laser is used as a laser beam source and has a beam power in a multi-kilowatt range.

13. The method of claim 1, wherein a welding rate of greater than 0.5 m/min is used when a laser-guided process is involved.

14. The method of claim 1, further comprising, prior to the welding step of the first weld region, the step of placing a bath support device to form the root in a non-contacting manner and to transmit a laser irradiation through the root during laser welding for reflection by a recess in the bath support device in a direction of a forming seam root region.

15. The method of claim 14, further comprising the step of flushing the recess with a process gas during welding.

16. The method of claim 15, wherein the process gas has inert, active and/or reducing properties.

17. The method of claim 1, wherein the V shaped second weld region is defined by an opening angle of maximal 70°.

18. The method of claim 1, wherein the V shaped third weld region is defined by a flank angle of maximal 30° on each side of the V.

19. The method of claim 18, wherein the flank angles of the workpieces to be welded together are uneven.

20. The method of claim 1, wherein the proportion of the laser power of a total power introduced into the weld joint is greater in the first weld region than in the third weld region, when the hybrid laser arc welding is involved.

* * * * *